March 11, 1969  W. W. LYTH  3,432,004
PNEUMATIC CYCLE RATIONING CONTROL
Filed Aug. 10, 1966

INVENTOR
WILLIAM W. LYTH
BY Kramer & Sturges
ATTORNEYS

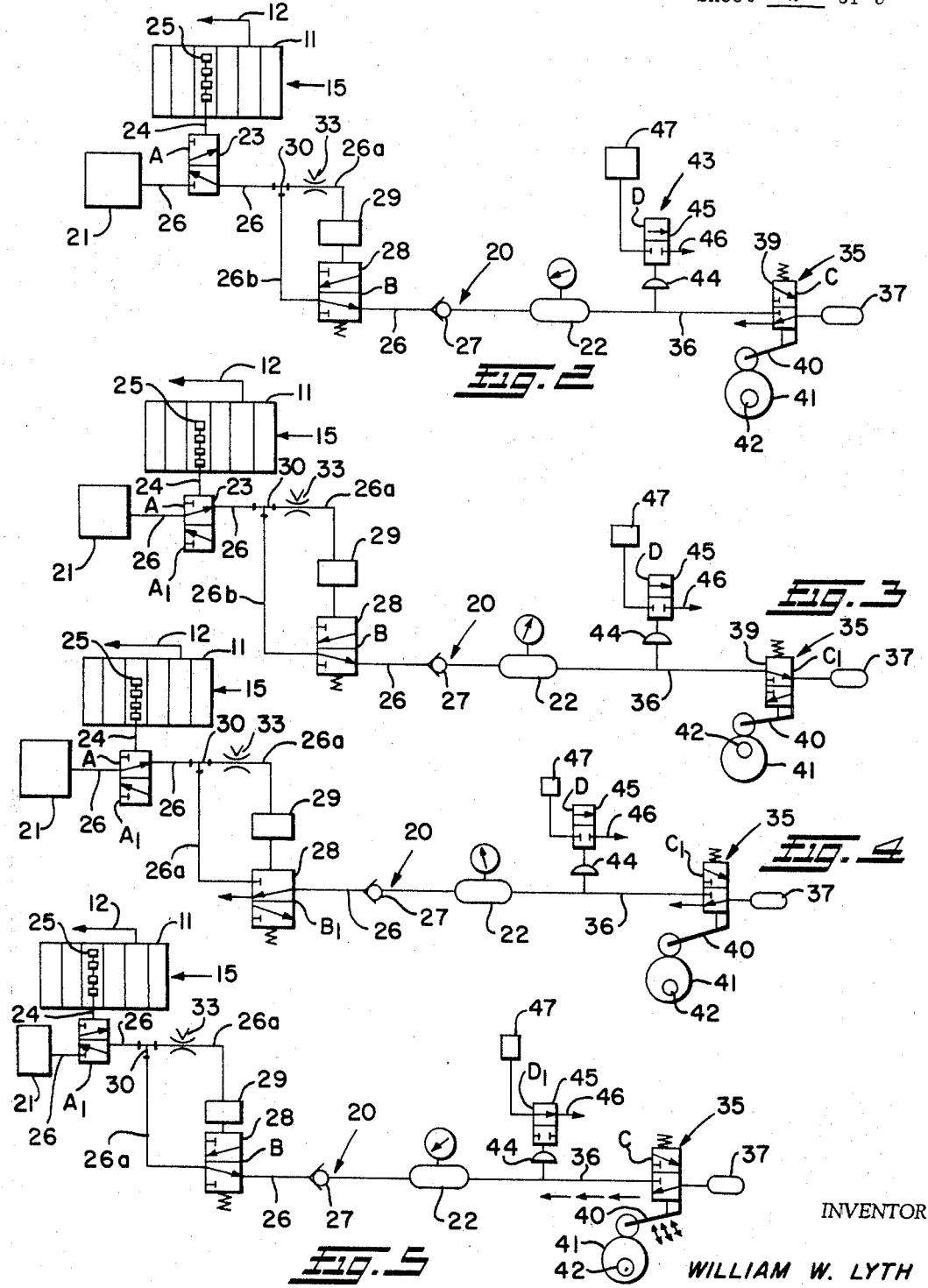

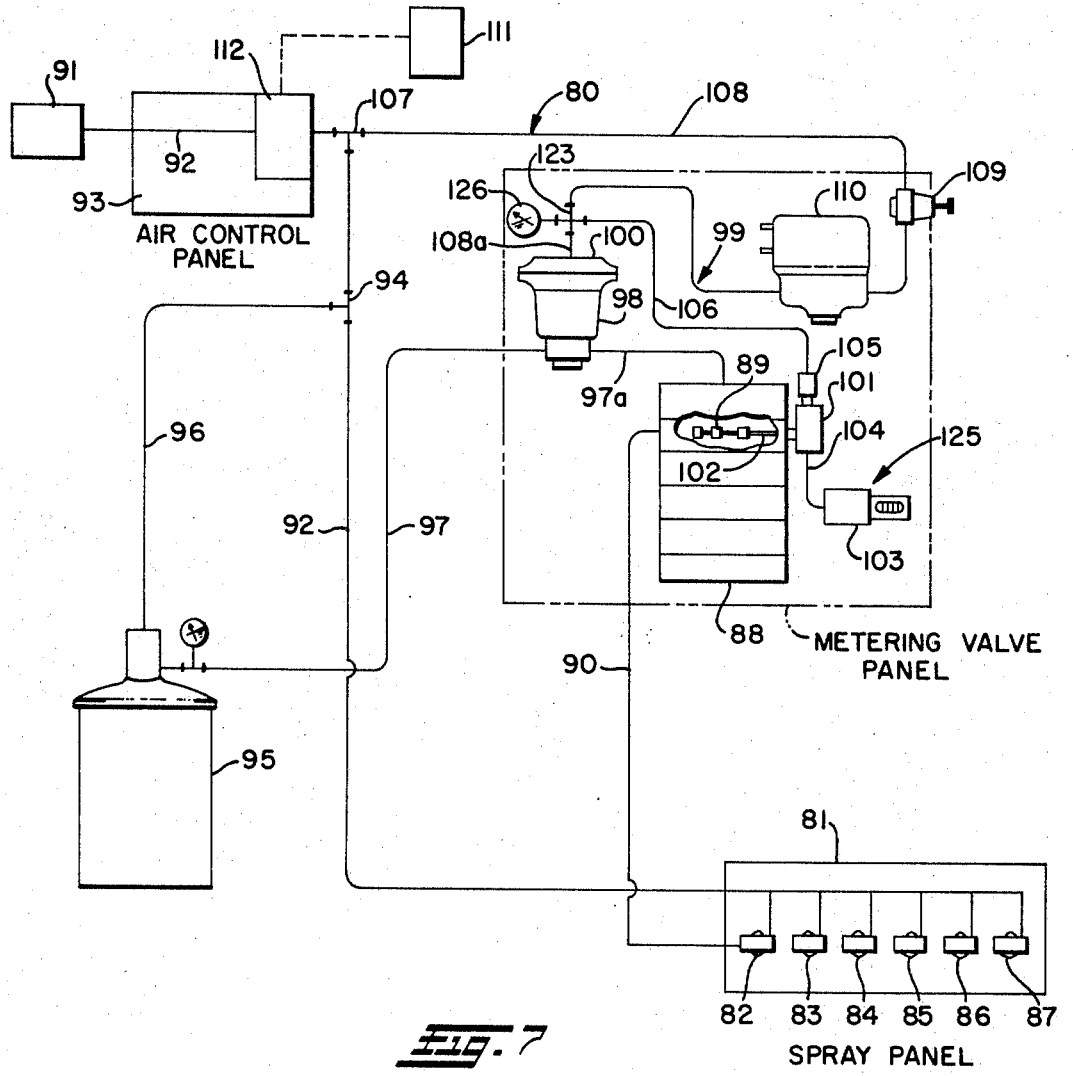

United States Patent Office 3,432,004
Patented Mar. 11, 1969

3,432,004
PNEUMATIC CYCLE RATIONING CONTROL
William W. Lyth, Cleveland, Ohio, assignor to Eaton Yale & Towne Inc., Cleveland, Ohio, a corporation of Ohio
Filed Aug. 10, 1966, Ser. No. 571,596
U.S. Cl. 184—6     15 Claims
Int. Cl. F01m 1/00; F16n 17/06, 29/00

ABSTRACT OF THE DISCLOSURE

An apparatus to monitor the flow of lubricant from a cyclic lubricator to the object to be lubricated. A source of pressurized fluid introduces a charge of fluid into an accumulator once during each cycle of the lubricator. A mechanism bleeds fluid from the accumulator during each cycle. Failure of the lubricator to transport lubricant will terminate the charging operation and allow the bleeding mechanism to reduce the pressure in the accumulator below a predetermined level which in turn initiates an alarm or terminates the operation of the device being lubricated.

---

This invention relates to lubricating systems and more specifically to particular arrangements for monitoring lubricating systems supplying lubricants to a plurality of points.

The invention is particularly well suited for use with so-called single-line progressive lubricating systems in which lubricant is supplied from a single supply line through an inlet to a divisional feeder of the type described and illustrated in U.S. Patent Nos. 2,834,433 and 2,792,911.

An object of the invention is to monitor the flow of lubricant to guard against damage to bearings or other apparatus being lubricated in consequence of the lubricating system failing to continue functioning, or in consequence of undue retardation of the operation of the lubricating system. More specifically, the invention will detect the aforementioned condition, produce an alarm, shut down the operation of the lubricating system, or terminate the operation of the apparatus being lubricated. Further, the object of the invention can be accomplished without need for electrical circuits, electrical contacts or other electrical apparatus which may produce sparking or other explosion hazards in explosive or combustible atmospheres in which the lubricating system may be operating.

Briefly stated, the invention is in a system for monitoring the flow of lubricant in a lubricating system employing a manifold for metering lubricant under pressure to a plurality of points where needed. The lubricating system is provided with a pump for supplying grease, oil or other lubricant under pressure to the manifold. The monitoring system is provided with a source of fluid other than the lubricant, under pressure. An accumulator having a fixed volume, is associated with the lubricating system, and the manifold in particular, for periodically receiving a charge of fluid from said source to keep the fluid pressure within the accumulator from reaching, or falling to a predetermined level. Means are provided for intermittently bleeding a portion of the fluid under pressure from the accumulator in order to reduce the fluid pressure in the accumulator to the predetermined level should the accumulator fail to be charged. The monitoring system is completed by providing means which are responsive to fluid pressure for indicating when the fluid pressure in the accumulator has reached the predetermined level. The fluid responsive means will act to control the flow of lubricant to the metering manifold when the predetermined pressure level is reached, e.g., the lubricating system, or the operation of the apparatus requiring lubricant will be shut down.

The following description of the invention will be better understood by having reference to the annexed drawing wherein:

FIGS. 2–5 are diagrammatic illustrations of the monitoring system employed in the lubricating system of FIG. 1 showing the sequential operation of the system;

FIG. 7 is a diagrammatic illustration of another lubricating system employing a monitoring system utilizing another embodiment of the invention.

Figure 1:
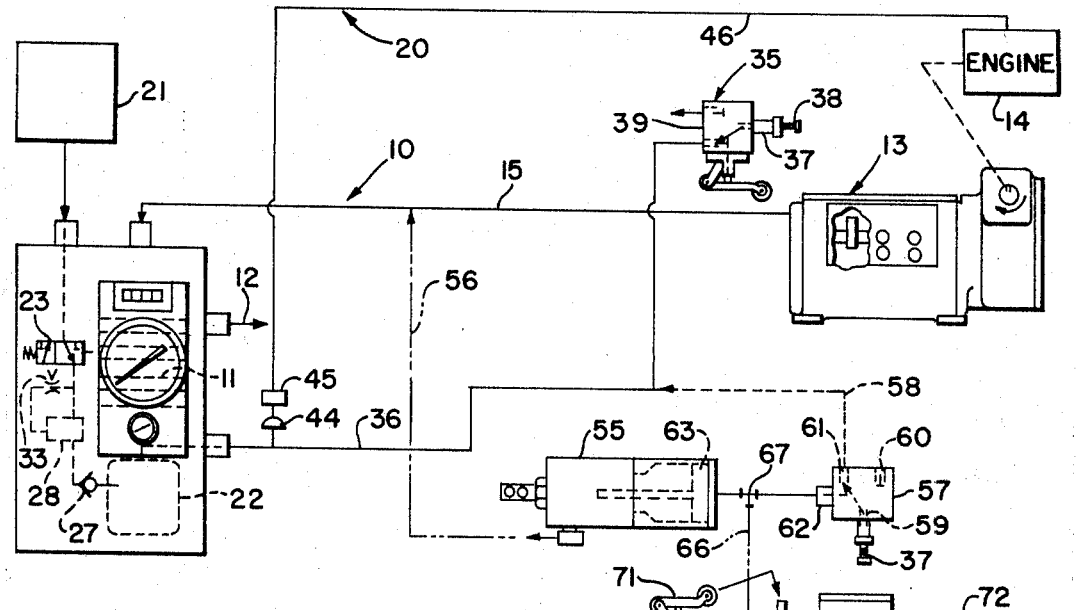
FIG. 1 is a diagrammatic illustration of a lubricating system employing a system for monitoring the distribution of lubricant, the monitoring system being an embodiment of the invention.

Lubricating system of FIG. 1

Referring generally to FIGS. 1–5 of the annexed drawing, there is shown a lubricating system generally indicated at 10. The lubricating system 10 is of the so-called single-line progressive type, and essentially comprises a manifold 11 for metering or distributing lubricant under pressure to, for example, a plurality of bearings or other moving parts requiring lubricant. The manifold 11 includes a plurality of adjacently disposed reciprocating valves having connecting supply lines, e.g., line 12, for carrying lubricant to the bearings, etc. The operation of each valve is dependent upon the preceding valve functioning properly.

A pump 13 is used for supplying lubricant, e.g., grease or oil, under pressure to the manifold 11. The pump 13 is mechanically driven by any suitable means, e.g. an internal combustion engine 14. The lubricant is supplied to the manifold 11 through a single supply line 15.

A system for monitoring the flow of lubricant in the lubrication system of FIG. 1

A system generally indicated at 20 is provided for monitoring the flow of lubricant in the lubricating system 10. The sequential operation of the monitoring system 20 is more clearly understood by having reference to FIGS. 2–5. The system 20 is designed to monitor the sequential operation of the valves reciprocating in the manifold 11. In other words, the system 20 will indicate when the manifold 11 is not functioning properly, e.g., a valve failing to complete its cycle.

Fluid, e.g., air, other than the lubricant and under pressure, is used to operate the monitoring system 20. A compressed air tank 21, is provided for supplying air at a constant pressure, to a main accumulator 22 having a predetermined fixed volume. In this lubricating system 10, the accumulator 22 is periodically charged with compressed air. The charging of the main accumulator 22 is dependent on, and related to the cycling operation of the manifold 11, that is, the sequential operation of the valves within the manifold 11. In this instance, the main accumulator 22 is charged once for every complete cycle of the metering manifold 11.

This is accomplished by coupling a cycle sensing air valve 23, hereafter referred to as the CSA valve, to one of the valves reciprocating within the manifold 11, i.e., the CSA valve 23 is coupled to the valve stem 24 of valve 25, protruding from the manifold 11. Thus, the CSA valve 23 is reciprocated or moved in response to movement of the manifold valve 25.

The CSA valve 23 is placed in a supply line 26 connecting the air tank 21 with the main accumulator 22. A check valve 27 is placed in the supply line 26 between the main accumulator 22 and the CSA valve 23.

A shut-off valve 28 including an air pilot 29, is provided in the supply line 26 between the check valve 27 and the CSA valve 23. The air shut-off valve 28 is a normally open three-way two-position pilot-operated valve, while the cycle-sensing air valve 23 is a normally closed three-way valve.

Figures 6, 8:
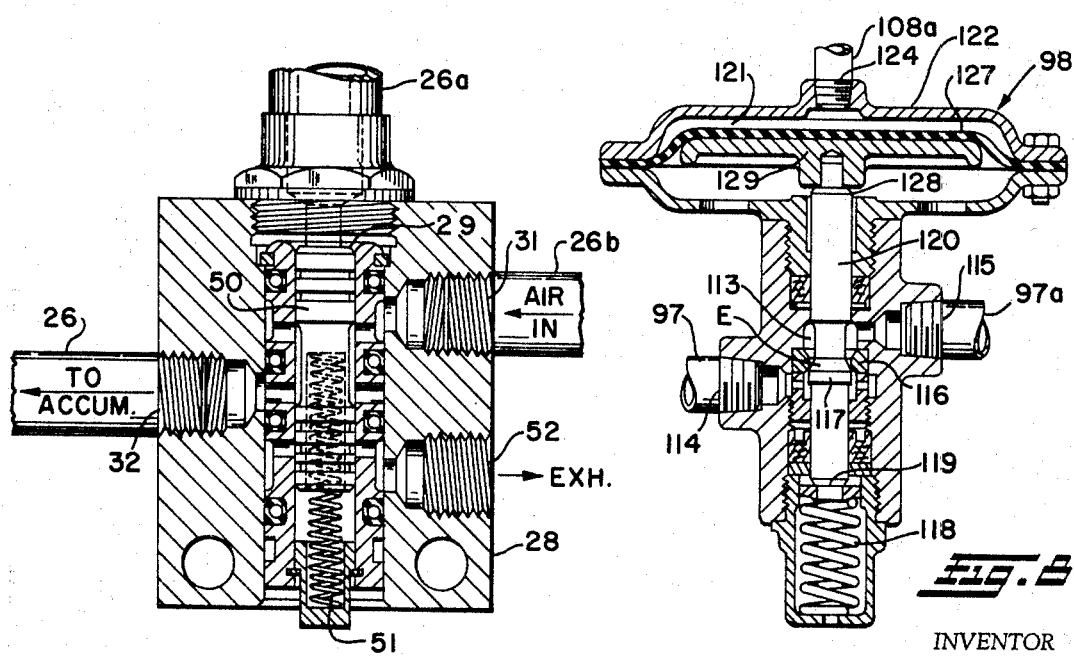
FIG. 6 is a longitudinal sectional view of a pilot-operated air valve which can be employed in the monitoring system for responding to cycles of operation of a lubricant manifold or feeder, the section being in a plane passing through the longitudinal axis of the valve.
FIG. 8 is a longitudinal cross-sectional view of a valve used in the lubricating and monitoring systems illustrated in FIG. 7.

In order to connect the shut-off valve 28, the supply line 26 as it leaves the CSA valve 23, is split into trunk lines 26a and 26b by a T-connection 30. One trunk line 26a is connected to the air pilot 29, while the other trunk line 26b is secured to an inlet port 31 of the shut-off valve 28 (FIG. 6).

The supply line 26 leading to the check valve 27 and main accumulator 22 is connected to the shut-off valve 28, by securing the end of the line 26 to an outlet port 32 of the valve 28. A needle valve 33 is placed in the trunk line 26a between the air pilot 29 and the T-connection 30.

The monitoring system 20 contemplates bleeding a predetermined volume of air from the main accumulator 22 at intermittent intervals of time relative to the periodic charging of the main accumulator 22. The main accumulator 22 is charged once for every complete cycle of the manifold 11 in order to keep the air pressure within the main accumulator 22 from reaching or falling to a predetermined level. The bleeding mechanism, generally indicated at 35, on the other hand, is set to periodically bleed a portion of the compressed air from the main accumulator 22 such that should the main accumulator 22 fail to be charged on the next succeeding cycle of the manifold 11, the air bled from the main accumulator 22 would be such as to drop the air pressure to the predetermined level. Upon reaching this level, the monitoring system 20 is designed to indicate that the lubricating system 10 is not working properly, that is the valves within the manifold 11 are not completing their cycling operation. This indication can be in the form of a visual alarm, or can be utilized to shut down the internal combustion engine 14 operating the pump 13.

The bleeding mechanism 35 communicates with the main accumulator 22 through a conduit or line 36.

The bleeding mechanism 35 comprises a secondary accumulator 37 which has a smaller volume than the main accumulator 22. The volume of the secondary accumulator 37 can be varied by an adjusting screw 38 (FIG. 1). The bleeding mechanism 35 also includes an air dumping valve 39. The air dumping valve 39 is preferably, a normally closed three-way two-position valve, and is moved from one position to another by the operation of the pump 13.

This is accomplished by mounting the air dumping valve 39 on a cam follower 40 which rides on a cam 41 mounted on the pump shaft 42. Thus, the pump 13 which supplies lubricant under pressure to the manifold 11 to reciprocate the manifold valves and charge the main accumulator 22, is utilized to operate the air dumping valve 39 in order to bleed air from the main accumulator 22.

A device, generally indicated at 43, which is responsive to fluid pressure change, is placed in the line or conduit 36 between the main accumulator 22 and the bleeding mechanism 35. The device 43 is used for checking the air pressure within the main accumulator 22, and indicating when the predetermined pressure level has been reached. The pressure sensing device 43 includes a collapsible diaphragm 44 in association with a valve 45. When the pressure in the main accumulator 22 and line 36 reaches the predetermined level the diaphragm will collapse causing the valve 45 to shift position. The valve 45 in its new position can activate a visual alarm or, for example, supply air to line 46 to shut down operation of the engine 13.

*Operation of the lubricating system 10 as illustrated in FIGS. 2–5*

To better describe the operation, we will assume that the manifold 11 is being supplied with lubricant, and the valve 25 is positioned to begin its cycle (FIG. 2). The CSA valve 23 coupled to the valve stem 24 is in its closed position A, wherein the line 26 between the CSA valve 23 and T-connection 30 is exposed to the atmosphere, and the main accumulator 22 is out of communication with the compressed air tank 21. The shut-off valve 28 is in its normally open position B, wherein the subline 26b is in communication with the main accumulator 22. The air dumping valve 39 of the bleeding mechanism 35 is in its normally closed position C, wherein the secondary accumulator 37 is exposed to the atmosphere.

Referring to FIG. 3, the pump 13 supplies lubricant to the manifold 11 to move the valve 25 through one-half of its complete cycle which moves the CSA valve 23 to its open position $A_1$, wherein the air tank 21 is placed in communication with the main accumulator 22. The main accumulator 22 receives a charge of air from the tank 21.

Simultaneously a portion of the air is diverted through the needle valve 33 in subline 26a and into the air pilot 29. As seen in FIG. 6, when the shut-off valve 28 is in its normally open position B, the subline 26b is in communication with the line 26 and main accumulator 22. As pressure builds up in the air pilot 29, force is exerted to move the piston or valve 50 axially against the coil spring 51 used to bias the piston 50 in its normally open position B.

The valve 50 moves the subline 26b out of communication with the line 26 leading to the main accumulator 22, and moves the line 26 into communication with the fluid outlet port 52 communicating with the atmosphere. This sequence of events just described occurs in a very brief interval of time, generally less than one-half second, thus the accumulator is assumed to be charged instantaneously in comparison to the cycling rate of the lubrication system itself. The check valve 27 seals the main accumulator 22. The shut-off valve 28 is in its closed position $B_1$ illustrated in FIG. 4.

The air dumping valve 39 of the bleeding mechanism 35, is moved to its open position $C_1$, wherein the secondary accumulator 37 is placed in communication with the main accumulator 22. The secondary accumulator 37 receives a charge of air from the main accumulator 22.

The rotating pump shaft 42 acts to return the air dumping valve 39 back to its normally closed position C (FIG. 4) at which position the charge of air in the secondary accumulator 37 is exhausted into the atmosphere. The pump shaft 42 as it continues to rotate alternately puts the secondary accumulator 37 in communication with the main accumulator 22 and atmosphere.

In the meantime the manifold valve 25 completes its cycle (FIG. 5) and the CSA valve 23 is returned to its closed position A where the air pilot 29 is exposed to the atmosphere. The air within the air pilot 29 is exhausted into the atmosphere causing the coil spring 51 to return the piston back to its restive position and the shut-off valve 28 back to its normally open position B, wherein the subline 26b is again in communication with the line 26 leading to the main accumulator 22. The operation is repeated as the manifold valve 25 continues to cycle.

As previously indicated, the main accumulator 22 receives a charge of air once for every complete cycle of the manifold valve 25. The main accumulator 22 receives this charge of air to maintain a predetermined pressure level within the main accumulator 22, and keep it from falling to a predetermined lower pressure level. On the other hand, the bleeding mechanism 35 is periodically removing air from the main accumulator 22 in order to reduce the pressure within the main accumulator 22 to the predetermined lower pressure level. The secondary accumulator 37 is adjusted to reduce the air pressure within the main accumulator 22 to, or below the predetermined lower pressure level should the main accumulator 22 fail to be charged on the next succeeding cycle of the manifold piston 25. When the air pressure within the main accumulator 22 reaches the predetermined lower level, the diaphragm 44 collapses to move the valve 45 from its closed position D (FIG. 2) to its open position $D_1$ (FIG. 5). In position $D_1$ the valve 45 places the line 46 leading to the engine 14 in communication with another air supply 47. Air under pressure from the air supply 47 is utilized to either shut off the engine 14 and lubricating system 10, or activate some type of visual or audio alarm.

An example of such a monitoring system 20, would be to provide a main accumulator 22 which is charged to 100 p.s.i. every complete cycle of the manifold piston 25. The predetermined pressure level at which the diaphragm 44 will collapse is 35 p.s.i. The pump shaft 42 makes three revolutions for every complete cycle of the manifold piston 25, and the bleeding mechanism 35 is adjusted to reduce the pressure within the main accumulator 22 to below 35 p.s.i. on the fourth revolution of the pump shaft 42. Thus, on the third rotation of the pump shaft 42 the air pressure in the main accumulator 22 is still above 35 p.s.i. Should the manifold valve 25 fail to cycle and recharge the accumulator 22 back to 100 p.s.i., the bleeding mechanism 35 on the next or fourth revolution of the pump shaft 42, will reduce the pressure within the main accumulator 22 below the predetermined level of 35 p.s.i. to collapse the diaphragm 44 and initiate the alarm system.

The lubricating system 10 has been described as being used with a mechanically driven, or motor driven pump 13. The lubricating system 10 can be used with any type of pump or constant speed lubricant supply. For example, as illustrated in FIG. 1, in place of the pump 13, an air-operated piston-type single-shot pump 55 can be employed. The pump 55 is similarly connected to the main lubricant supply line 15, for example, through line 56.

When the air-operated pump 55 is used instead of the pump 13, the bleeding mechanism valve 39 is replaced by a three-way valve 57 which is connected to the conduit 36 through, for example, air line 58. The valve 57 like the valve 39 is a three-way valve with a common port 59 communicating with the secondary accumulator 37, an exhaust port 60, and a port 61 to which the air supply line 58 is connected.

The three-way valve 57, however, instead of being cam operated is pilot operated having an air pilot chamber 62. The air-operated single shot pump 55 has a piston 63 connected to an air supply 64 through a cam operated three-way valve 65. The valve 65 is arranged to simultaneously actuate the single-shot pump 55 and the pilot operated three-way valve 57. This is accomplished as shown in FIG. 1, by connecting an air line 66 through a T-connection 67 to both the single-shot pump 55 and the pilot chamber 62. Any suitable means, e.g., an air motor 68, can be provided for operating the three-way valve 65 at a uniform rate of speed. A cam 69 similar to the cam 41, is mounted on the shaft 70 of the motor 68. A cam follower 71 similar to the cam follower 40, is coupled to the three-way valve 65 and rides on the cam 69. The air motor 68 is provided with an air supply 72. The operation using the air motor 68 or pump 12 are essentially the same.

*Lubricating and monitoring system illustrated in FIG. 7*

Referring more particularly to FIG. 7, there is shown another lubricating system generally indicated at 80. The lubricating system 80 comprises a spray panel 81 having a plurality of nozzles 82–87. The nozzles 82–87 are used, for example, to spray lubricant, e.g., oil or grease, on bearings or gears. A similar manifold 88 is used to meter or distribute lubricant under pressure to the spray nozzles 82–87, e.g., a reciprocating valve 89 within the manifold 88 regulates the flow of lubricant through a conduit or supply line 90 leading to the spray nozzle 82. Fluid, e.g., air, under pressure from a source of supply, e.g., tank 91, is mixed with the lubricant at the nozzles, and the lubricant is sprayed from the nozzles in a fine mist upon the bearings or gears. Air under pressure is brought from the compressed air tank 91 to the nozzles 82–87 through an air line 92.

A panel 93 is interposed in the air line 92 adjacent the supply tank 91 for controlling the supply or flow of air under pressure, to the nozzles 82–87.

A T-connection 94 is provided in the air line 92 to divert a portion of the air to an air-operated barrel pump 95, the air being diverted through the T-connection 94 into a trunk supply line 96 connected to the barrel pump 95. The barrel pump 95 contains the lubricant. The air forces lubricant from the pump 95 into a lubricant supply line 97 leading to the manifold 88.

An air-operated shut-off valve 98 is provided in the lubricant supply line 97 between the manifold 88 and the barrel pump 95, the shut-off valve 98 (FIG. 8) being used to regulate the flow of lubricant from the barrel pump 95 to the manifold 88.

The inventive concept of charging a confined volume with air to a predetermined pressure level, and periodically bleeding air from the confined volume at predetermined intervals of time in order to reduce the air pressure within the confined volume to a predetermined pressure level before the confined volume can be recharged, is used to control the volume of lubricant through the shut-off valve 98. That is, it acts to close the valve 98 to stop the flow of lubricant into the manifold 88.

The system for monitoring the flow of lubricant through the shut-off valve 98 is generally indicated at 99. The monitoring system 99 also comprises a main accumulator 100, which is in communication with the shut-off valve 98. Similarly, a three-way two-position valve is coupled to one of the valves or pistons reciprocating in the manifold 88, e.g., the valve 101 is coupled to the stem 102 of valve 89.

A secondary accumulator in the form of a pneumatic cycle totalizer 103 is placed in communication with the valve 101 through a supply line 104. The amount of air bled from the main accumulator 100 is adjusted by varying the size of the orifice through which air from the accumulator 100 passes through the valve 101 into the totalizer 103 whose diaphragm operator section has a volume smaller than the volume of accumulator 100. This is accomplished by providing an adjustable orifice fitting 105 in the air line 106 leading from the main accumulator 100 to valve 101.

A T-connection 107 is provided in the air line 92 adjacent the air control panel 93, in order to divert a portion of the air into a trunk line 108 leading to the main accumulator 100.

A pressure regulator 109 and an air-actuated two-way valve 110 with a time delay head, are successively provided in the trunk line 108 between the T-connection 107 and the main accumulator 100.

*Operation of the lubricating system 80 illustrated in FIG. 7*

We will assume the lubricating system 80 is quiescent and lubricant is not being sprayed from the nozzles 82–87. A timer 111 associated with the air control panel 93 is provided for timing the intervals between the operation of the lubricating system 80. At the point in time when the parts require lubricant, the timer 111 will activate, for example, a solenoid valve 112 on the panel 93, to open the air supply line 92 permitting compressed air to flow from the tank 91 into the spray nozzles 82–87.

Simultaneously, a portion of the air is diverted into the barrel pump 95, and lubricant is forced into the supply line 97 leading to the shut-off valve 98 and manifold 88. The shut-off valve 98 is normally in a closed position as illustrated in FIG. 8, and keeps lubricant from entering the manifold 88.

The valve 98 has an internal passageway 113 communicating with an inlet port 114 and an outlet port 115. A valve seat 116 is provided in the passageway 113 between the inlet and outlet ports. A valve 117 is biased against the valve seat 116 closing the lubricant passageway 113. The valve 117 is held in seating relation with the valve seat 116 by a coil spring 118 acting on one end 119 of the valve stem 120. The lubricant supply line 97 from the barrel pump 95 is connected to the inlet port 114, and the lubricant supply line 97a, a continuation of line 97, is connected to the outlet port 115 and leads to the manifold 88.

Also simultaneously, air is diverted into the trunk line 108, through the pressure regulator 109 and two-way valve 110, and into the accumulator 100. The accumulator 100 can be in the form of a separate accumulator communicating with the valve 98. However, in this case the accumulator 100 is a recess 121 formed in the head 122 of the valve 98. The line 108a leads to a port 124 communicating the recess 121. A cross connection 123 is provided in the line 108a adjacent the valve head 122. The air supply line 106 leading to the bleeding mechanism generally indicated at 125, and a pressure indicator 126 are connected to the cross connection 123, the indicator 126 providing a visual indication of the air pressure in accumulator 100.

A flexible diaphragm 127 is provided in the recess 121 of the valve head 122. Air under pressure moves into the valve recess 121 and acts upon the diaphragm 127, moving it in a direction towards the other end 128 of the valve stem 120. The diaphragm 127 carries a valve actuating portion 129 which engages the valve stem end 128, and axially moves the stem 120 against the coil spring 118 to unseat the valve 117. When the valve 117 is unseated, lubricant under pressure at the inlet port 114 passes through the fluid passageway 113 and out of the outlet port 115, through the line 97a and into the manifold 88.

The valves or pistons within the manifold 88 are activated by the flow of lubricant, and begin to cycle, thereby directing lubricant to the nozzles 82–87. The lubricant mixes with the air and is sprayed from the nozzles 82–87 in a fine mist.

The two-way valve 110 was indicated as having a time delay head. After a predetermined interval of time passes, the timer within the head acts to close the valve 110, thereby trapping air at a predetermined pressure set by the pressure regulator 109, in the main accumulator 100, e.g., the valve recess 121.

The valve 89 within the manifold 88 as it reciprocates in one direction, opens the valve 101 permitting a charge of air to be bled from the recess 121 into the smaller volume within the pneumatic diaphragm cavity of the totalizer 103. When the valve 89 completes its cycle by reciprocating in the opposite direction, the valve 101 is moved to its other position, where the totalizer 103 is sealed from the main accumulator 100 and put in communication with the atmosphere. The air bled from the recess 121 into the totalizer 103, is thus exhausted into the atmosphere. The valve 89 continues to reciprocate bleeding a portion of the air from the recess 121 for every complete cycle of the manifold 88. The force exerted upon the diaphragm 127 by the compressed air is thereby gradually reduced until the force exerted by the coil spring 118 upon the valve stem 120 is sufficient to take over and move the stem 120 against the diaphragm 127, and return the valve 117 to its normally closed and seated position E (FIG. 8). Once the valve 117 is seated the flow of lubricant passing through the valve 98 is cut off or stopped.

When the flow of lubricant is stopped, a back pressure will begin building up within the barrel pump 95. However, the barrel pump 95 is provided with a safety feature allowing the pump to stall out when the pressure within the pump reaches a predetermined level.

Air will continue to flow from the spray nozzles 82–87 after the supply of lubricant has been shut off, until the timer 111 deactivates the solenoid valve 112 to cut off the air supply 91 from the nozzles 82–87. The air that pours through the nozzles after the lubricant supply has been shut off acts to purge and clean the nozzles 82–87. When the system calls for more lubricant the timer 111 will activate the solenoid 112 to repeat the operation of the lubricating system 80.

The system 20 illustrated in FIGS. 1–5 can also be used in conjunction with this particular lubricating system 80 for monitoring the operation of the manifold 88.

Thus, there has been provided a new and novel system based on the all pneumatic principle of using the ratio of volumes between two accumulator devices for monitoring and controlling the flow of lubricant, and in particular the flow of lubricant through a manifold used in so-called single-line progressive lubricating systems.

What is claimed is:

1. In combination:

(a) a manifold for metering lubricant under pressure;

(b) a pump for supplying lubricant under pressure to the manifold;

(c) a source of fluid other than the lubricant, under pressure;

(d) an accumulator associated with the manifold for receiving a charge of said fluid under pressure;

(e) means coacting between said source and accumulator for charging the accumulator with said fluid under pressure to keep the fluid pressure in the accumulator from reaching a predetermined level;

(f) means for periodically bleeding a portion of the fluid under pressure from the accumulator to reduce the fluid pressure in the accumulator to a predetermined level should the means (e) fail to charge the accumulator; and (g) means responsive to fluid pressure, for indicating that the fluid pressure in the accumulator has reached the predetermined level.

2. The combination of claim 1 which includes:

(h) means coacting with the fluid responsive means (g) for controlling the supply of lubricant to the manifold.

3. The combination of claim 2 wherein the fluid bleeding means (f) includes:

(i) a second accumulator having a volume which is smaller and in predetermined proportion to the volume of said other accumulator (d), for periodically receiving a predetermined portion of the fluid under pressure from said other accumulator (d); and (j) means for alternately putting said second accumulator in communication with the other accumulator (d) and the atmosphere.

4. The combination of claim 3, wherein the lubricant supply controlling means (h) includes:

(k) means for shutting off the supply of lubricant from the pump.

5. In combination:

(a) a manifold utilizing a plurality of successively cycling valves for metering lubricant under pressure;

(b) a pump for supplying lubricant under pressure to the manifold;

(c) a source of fluid under pressure other than the lubricant;

(d) an accumulator associated with the manifold for receiving and storing said fluid under pressure from said source, said accumulator having a predetermined fixed volume;

(e) means responsive to at least one of the cycling valves of the manifold for intermittently charging the accumulator with fluid from said source to keep the fluid pressure in the accumulator from reaching a predetermined pressure level;

(f) another accumulator having a volume in predetermined smaller proportion to the said other accumulator (d) for periodically receiving a predtermined portion of the fluid under pressure from the larger accumulator (d) in order to reduce the pressure in said larger accumulator (d) to said predetermined pressure level;

(g) means responsive to the operation of the pump, for alternately putting the smaller accumulator (f) in communication with the larger accumulator (d) and atmosphere, whereby the smaller accumulator (f) receives fluid from the larger accumulator (d) and exhausts it into the atmosphere; and (h) means responsive to fluid pressure, for indicating that the fluid pressure in the larger accumulator (d) has reached the predetermined pressure level.

6. The combination of claim 5 which includes:

(i) means coacting with the fluid pressure responsive means (h) for controlling the flow of lubricant to the manifold.

7. The combination of claim 6 wherein the lubricant flow controlling means (i) includes means for terminating operation of the pump.

8. The combination of claim 7 wherein the accumulator charging means (e) includes:

(1) a valve responsive to fluid under pressure from the source (c), coacting with the larger accumulator (d) for alternately placing said accumulator in communication with the fluid source (c) and the atmosphere; and (2) a check valve coacting between the accumulator (d) and said valve (1) for preventing fluid under pressure in said accumulator from escaping into the atmosphere when the valve (1) places the accumulator (d) in communication with the atmosphere.

9. The combination of claim 8 wherein the means (e) also includes:

(3) a second valve coupled to one of said cycling manifold valves, and interposed between said source (c) and valve (1), for periodically placing the valve (1) in communication with the source (c).

10. A flow monitoring control system comprising in combination a fluid pump, a fluid manifold supplied with fluid by said pump, a source or pressure having a predetermined fixed pressure, a pressure accumulator, a conduit connecting said source and said accumulator, a valve associated with said manifold with means for opening the said valve during each cycle of operation of the manifold, said valve being in said conduit for controlling admission of pressure from said pressure source to said accumulator, a bleed valve associated with said pump, means for opening said bleed valve intermittently at a rate proportional to the rate of operation of the pump, said pressure accumulator having a bleed line to which the bleed valve is connected and being proportioned to release a predetermined fraction of the pressure of said accumulator, a pressure responsive alarm set to operate when the accumulator pressure falls to a predetermined fraction of the pressure of said pressure source.

11. A flow monitoring and lubricant system control comprising in combination a lubricant pump driven at a uniform speed, a lubricant manifold of the type supplying a plurality of lubricant outlets in succession and having an inlet connected to said lubricant pump, a fluid supply having a predetermined fixed pressure, a pressure accumulator, a conduit joining said source and said accumlator, a valve associated with said manifold with means for opening said valve during each cycle of operation of the manifold, said valve being in said conduit for controlling admission of fluid under pressure from said pressure source to said accumulator, a bleed valve associated with said pump, means for opening said bleed valve intermittently at a rate proportioned to the rate of operation of the pump, said accumulator having a bleed line to which the bleed valve is connected and being proportioned to release a predetermined fraction of the pressure of said accumulator for each opening of the bleed valve, and a pressure responsive alarm connected to said accumulator set to operate when the accumulator pressure falls to a predetermined fraction of the pressure of said fluid supply pressure source.

12. A lubricant control system as in claim 11, in which the fluid supply is a source of compressed air.

13. Apparatus as in claim 12, wherein a second accumulator is provided having a size which is a fraction of the size of the first mentioned accumulator and the bleed valve is a two-position, three-way valve connecting the bleed line to the fractional size accumulator in one position and in the other position closing the bleed line and opening the fractional size accumulator to atmosphere whereby, each operation of the bleed valve results in a transfer of a predetermined fraction of the pressure from the first mentioned accumulator to the fractional size accumulator depending upon the relative sizes of the accumulators.

14. A system as in claim 13, wherein the valve associated with said manifold is a normally open two-position, three-way valve with a second position closing said conduit.

15. A system as in claim 13, wherein the valve associated with the manifold is a normally open two-position, three-way valve with a second position closing the conduit, said valve having an air pilot for actuation of the valve with an operating connection to said conduit, a needle valve in said operating connection for introducing time delay in the closing of said valve associated with the manifold, and a cycle sensing valve is provided in the conduit between the fluid supply and the connection through said needle valve, said sensing valve having an open position and a closed position and being moved back and forth from one position to the other cyclically during cycles of the operation of the manifold.

References Cited

UNITED STATES PATENTS

| 3,026,387 | 3/1961 | Ashbaugh. |
| 3,038,557 | 6/1962 | Callahan. |
| 3,106,262 | 10/1963 | Rogerson. |
| 3,223,198 | 12/1965 | Gruber. |

HOUSTON S. BELL, JR., *Primary Examiner.*

U.S. Cl. X.R.

184—7